(12) United States Patent
Hays et al.

(10) Patent No.: US 11,715,963 B1
(45) Date of Patent: Aug. 1, 2023

(54) BATTERY STORAGE CONTAINER AND WELLNESS SYSTEM

(71) Applicant: United States of America as Represented by the Secretary of the Navy, Arlington, VA (US)

(72) Inventors: Thomas H. Hays, Rockville, MD (US); Jessica E. Schwartz, Brookeville, MD (US); Gerard G. Back, Davidsonville, MD (US); Peter J. Disimile, Cincinnati, OH (US); Earl W. Armstrong, Washington, DC (US); Adam C. Dolezal, Silver Spring, MD (US); Evan T. Rule, Burtonsville, MD (US); Dennis P. Thompson, Jr., Greenbelt, MD (US); Ian E. Therrien, North Kingstown, RI (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 268 days.

(21) Appl. No.: 17/244,872

(22) Filed: Apr. 29, 2021

Related U.S. Application Data

(60) Provisional application No. 63/017,149, filed on Apr. 29, 2020.

(51) Int. Cl.
*H02J 7/00* (2006.01)
*H01M 10/44* (2006.01)
(Continued)

(52) U.S. Cl.
CPC .............. *H02J 7/0042* (2013.01); *A62C 3/16* (2013.01); *A62C 35/023* (2013.01);
(Continued)

(58) Field of Classification Search
CPC ........ H02J 7/0042; A62C 35/023; A62C 3/07; A62C 3/16; A62C 3/08; A62C 37/40; H01M 2200/00; H01M 50/209
See application file for complete search history.

(56) References Cited

U.S. PATENT DOCUMENTS 5,607,787 A * 3/1997 Wedlake .................. A62C 3/16
429/62
6,518,726 B1 2/2003 Nowlin, Jr. et al.
(Continued)

*Primary Examiner* — Christopher R Dandridge
(74) *Attorney, Agent, or Firm* — Dave Ghatt; Jesus J. Hernandez

(57) ABSTRACT

A battery storage container and wellness system designed for transporting, charging and storing batteries. The container having a plurality of compartments for storing and charging batteries, the compartments arranged in stacked vertical columns that are separated from each other by air-gaps. The battery storage container and wellness system also includes automatic fire suppression capabilities to prevent the propagation of cell-to-cell fires and other heat and energy related destructive events. The fire suppression capabilities include the air-gaps to prevent column-to-column spreading of fires. The storage container and wellness system also includes sensors for sensing fires, and a system for the application of fire mitigation fluids, for the exhausting of combustion gasses, and power shut-off means, in the event of a fire.

4 Claims, 6 Drawing Sheets

(51) Int. Cl.
*A62C 3/16* (2006.01)
*H01M 50/209* (2021.01)
*A62C 35/02* (2006.01)
*A62C 3/07* (2006.01)

(52) U.S. Cl.
CPC ....... *H01M 10/441* (2013.01); *H01M 50/209* (2021.01); *A62C 3/07* (2013.01); *H01M 2220/20* (2013.01)

(56) References Cited

U.S. PATENT DOCUMENTS

| | | |
|---|---|---|
| 8,558,507 B2 * | 10/2013 | Uchihashi ................ A62C 3/16 |
| | | 169/56 |
| 9,219,373 B2 | 12/2015 | Yu |
| 10,450,076 B2 | 10/2019 | Meis et al. |
| 10,454,286 B2 | 10/2019 | Torkestani et al. |
| 10,758,758 B2 | 9/2020 | Schmitt et al. |
| 2013/0134928 A1 * | 5/2013 | Uchihashi ............. H02J 7/0042 |
| | | 320/107 |

\* cited by examiner

BATTERY STORAGE CONTAINER AND WELLNESS SYSTEM

CROSS-REFERENCE TO RELATED APPLICATIONS

This application claims the benefit of U.S. Provisional Application No. 63/017,149 filed Apr. 29, 2020, titled "Lithium Battery Transportation Charging and Storage Container with Automatic Fire Suppression," incorporated herein by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The invention is directed to a battery storage container and wellness system designed for transporting, charging and storing batteries, particularly lithium ion batteries. The battery storage container and wellness system also including automatic fire suppression capabilities to prevent the propagation of cell-to-cell fires and other heat and energy related destructive events.

BACKGROUND

The hazards present in the transport of large amounts of lithium ion batteries are well recognized, particularly the dangers related to 'lithium plating' and 'thermal runaway', which ultimately could lead to fires or explosions. No technological solution has been developed to fully address these hazards. Current commercial solutions for shipping Li-ion batteries by air consist of passive fire containment bags ranging from cell phone sized to pallet sized.

Generally speaking, commercially used battery-shipping containers do not include any active mitigation to extinguish fires or arrest thermal runaway in the batteries. This scenario is detrimental, not only to the battery that is the source of the fire, but also, all batteries inside the container, resulting in the loss of all the stored batteries. Because of these inherent risks, existing procedures require lithium-ion batteries to be at or below 30% state of charging for air shipment. This is in response to a number of fire incidents involving air-carried lithium-ion batteries in recent years. This requirement is burdensome to logistics, as it involves processes having lengthy discharging and charging of batteries as part of the air shipment process.

It is desired to have a transport apparatus in which 100% state of charging is enabled, allowing batteries to arrive at full charge and ready for use, eliminating multiple hours of discharging and charging on either side of the transport mission. It is also desired to have a transport apparatus which reduces the risks to platforms and personnel, thereby increasing operational and logistical flexibility without compromising safety.

SUMMARY

In one aspect, the invention is a battery storage container and wellness system having a plurality of battery storage compartments. In this aspect, each battery storage compartment is rectanguloid and has a top portion, a bottom portion, a front portion, a back portion, and first and second side portions. According to the invention, each battery storage compartment has a door at the front portion for placing and removing batteries, a charging circuit and an associated charger port for charging batteries therein, and a sensor for detecting fires within the compartment. In this aspect, the battery storage container and wellness system also includes, a plumbing arrangement for supplying fire mitigating fluid to compartments experiencing fire events, an exhaust arrangement for exhausting combustion gasses and particles from compartments experiencing fire events, a sensor system including each of the fire detecting sensors, and a power supply to supply power to each charging circuit in each of the plurality of compartments. The invention also includes a control system having a controller electronically attached to each of the sensor system, plumbing arrangement, exhaust arrangement, and power supply. In this aspect, when the sensor system detects a fire, the controller initiates the plumbing arrangement to deliver fire mitigating fluid to affected compartments, and shuts off power to the charging circuits in the compartment or compartments experiencing fire events, and wherein the exhaust arrangement automatically exhausts combustion gasses and particles away from the affected compartments to the respective upper or lower plenum.

BRIEF DESCRIPTION OF THE DRAWINGS

Other features will be apparent from the description, the drawings, and the claims.

DETAILED DESCRIPTION

Figure 1A:
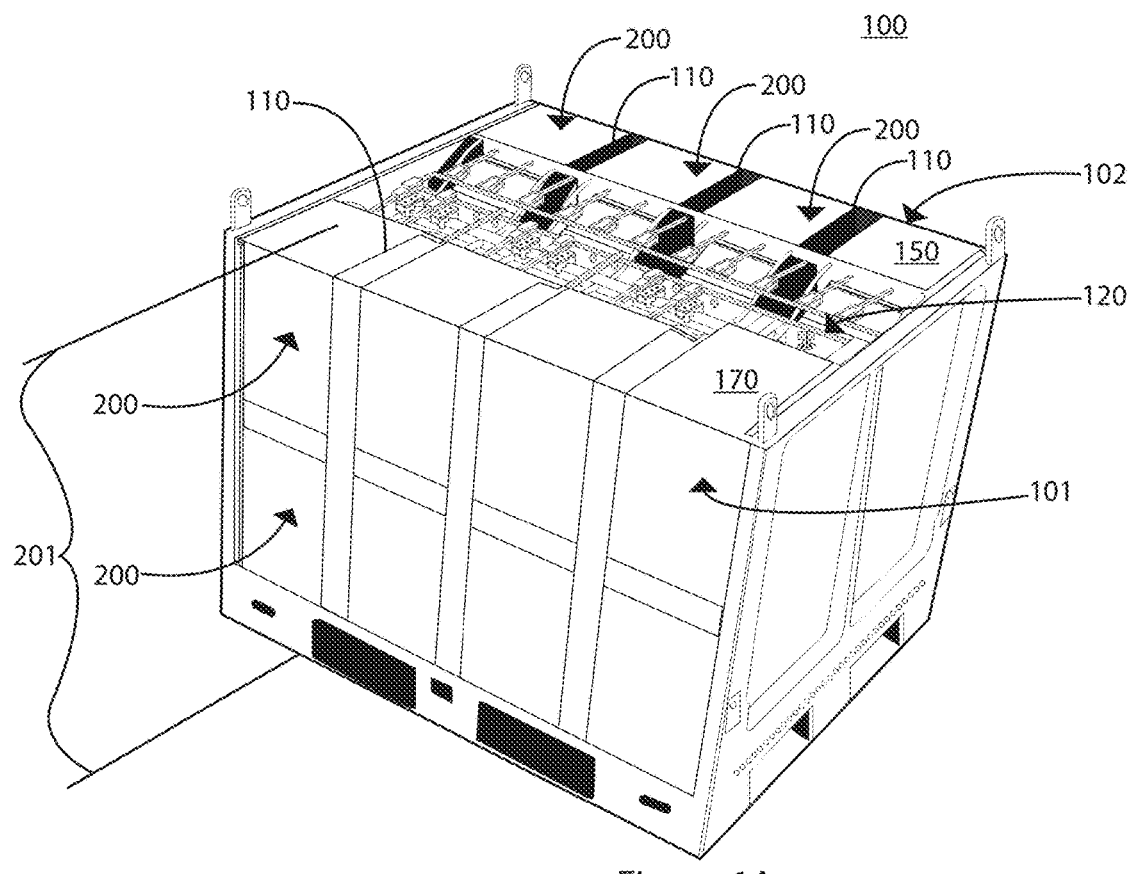
FIG. 1A is an exemplary perspective view of a battery storage container and wellness system, according to an embodiment of the invention.

FIG. 1A is an exemplary perspective view of a battery storage container and wellness system 100, according to an embodiment of the invention. As outlined below, the battery storage container and wellness system 100 is a robust container intended to safely transport, store, and charge lithium-ion batteries. The battery storage container and wellness system 100 also provides automatic fire suppression to prevent the propagation of cell-to-cell fires and other heat and energy related destructive events. The battery storage container and wellness system 100 is designed to meet the particular challenges associated with the transportation of Li-ion batteries by aircrafts. The system is also applicable to transportation by other modes, including transportation on land vehicles and on sea vessels. The system is also applicable to other types of batteries or electronics that have a tendency to overheat and catch fire.

As shown, the battery storage container and wellness system 100 is rectanguloid structure, having a first side 101 and a second side 102. As shown, each of the first side 101 and the second side 102 having a plurality of battery storage compartments/lockers 200. As outlined below, the battery storage compartments 200 may be made from steel and are for storing and charging Li-ion batteries therein. As stated above, the system 100 is designed to be employed on a transportation vessel such as an aircraft or a ship, upon which Li-ion batteries are being transported.

FIG. 1A shows the compartments 200 arranged in a series of columns 201, with each column 201 having two stacked compartments, i.e., upper and lower compartments. FIG. 1D is a stripped-away perspective illustration of the battery storage container and wellness system 100, and it also shows six compartments/lockers 200, facing the viewer, and six compartments 200 (partially hidden) at the back, for a total of twelve compartments. It should be understood that according to other embodiments, each column may have three or four or even more compartments 200. It is also within the scope of the invention to include more or less than the three columns on each side of the system 100. FIG. 1D also shows the dimensions of the system 100, having a length L, a width W, and a height H. According to an embodiment of the invention, L may be 51.75 inches, W may be 43.75 inches, and H may be 43 inches.

Returning to FIG. 1A, as shown there are air gaps 110 separating the columns 201 from each other. The air gaps 110 mitigate against the transfer of heat from one column to another. Therefore in instances of dangerously escalating heat due to thermal runaway, fires or explosions, the air gaps help mitigate against batteries in one column being destroyed by batteries in another column. As outlined below, the air gaps 110 in combination with the compartmentalization structure in which batteries are stored in compartments 200, inherently limits the number of batteries that can propagate from a thermal runaway event, effectively reducing the hazard of large numbers of batteries packed together in the battery storage container and wellness system 100. According to an embodiment of the invention, each air gap 110 may be about 1 inch.

FIG. 1A also shows a machine area 120 between the first side and the second side. This machine area provides an extended gap between compartments 200 on the first side of the 101 and compartments 200 on the second side 102. The machine area 120 includes an array of plumbing fixtures of a plumbing arrangement 130, for delivering fire mitigation agents to the compartments. The battery storage container and wellness system 100 also includes a mitigation agent storage booth 170, where there is a supply of mitigation agent 171 stored in supply containers. FIG. 1D shows the supply containers 172, which as outlined below, may be pressurized to enable the delivery of the mitigation agent 171 to the desired compartment(s). The two supply container 172 are provided to allow for the mitigation of fires in two different lockers before recharge is needed. Using solenoid valves, either container 172 can act on any of the twelve lockers.

The mitigation agent 171 (not shown) in the containers 172 may be a water/ethylene glycol mix, or other known agents such as aqueous vermiculite dispersion, FireIce, or the like. The anti-freeze based mitigation agent will continue to perform in sub-zero temperatures encountered in flight or in the field. As shown, the mitigation agent storage booth 170 is adjacent to one of the columns 201 at a corner of the first side 101. FIG. 1A also shows the hardware and controls bin 150, which stores the controller and related electronics for controlling the operations of the battery storage container and wellness system 100.

Figure 1B:
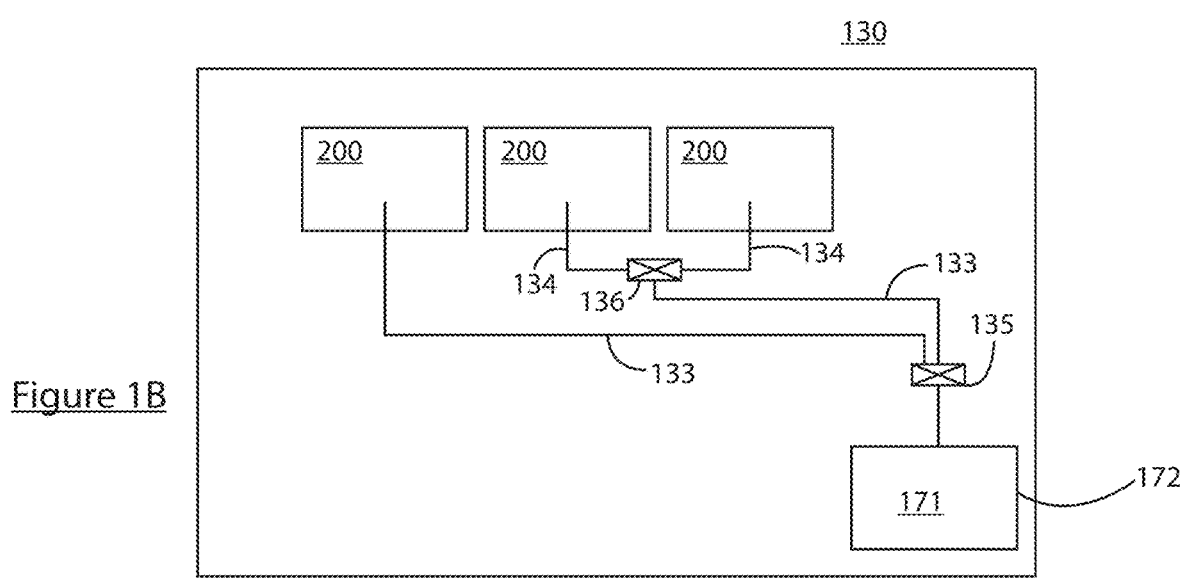
FIG. 1B is an exemplary schematic illustration of the plumbing arrangement of the battery storage container and wellness system, according to an embodiment of the invention

FIG. 1B is an exemplary schematic illustration of the plumbing arrangement 130 of the battery storage container and wellness system 100, according to an embodiment of the invention. FIG. 1B only shows three compartments 200 for convenience, but it is understood that the arrangement is applicable to all of the compartments 200 of FIG. 1A, and generally to any embodiment of the invention that includes an increased or reduced number of compartments 200. Additionally, FIG. 1B also only shows one of two supply containers 172, but it is understood that both supply containers have similar plumbing arrangements. As stated above, the two supply container 172 are provided to allow for the mitigation of fires in two different lockers before recharge is needed, and by using solenoid valves as shown in FIG. 1B, either container 172 can act on any of the twelve lockers.

FIG. 1B shows the plumbing arrangement 130 including the mitigation agent supply container 172 for dispensing fire mitigation agent 171. According to an embodiment of the invention, the supply container 172 is pressurized to facilitate the delivery of the fire mitigation agent 171 to any desired compartment 200. Alternatively, as known, one or more pumps may be associated with the container for delivering the fire mitigation agent 171. FIG. 1B also shows a plurality of dedicated lines 133 and 134 leading to specific compartments 200. The plumbing arrangement 130 also includes a valve 135, which may be a solenoid valve, for directing the flow of mitigation agent to the desired compartment.

FIG. 1B shows different arrangements for the dedicated lines 133 and 134. The lines 133 may extend directly from the mitigation supply containers 172 to the compartment 200. Alternatively, the lines 133 may be subdivided into two secondary lines 134 to serve two different compartments 200, with an additional/secondary valve 136 which may be a solenoid valve, for further directing the flow of the mitigation agent. It is within the scope of the invention to have either all direct lines 133, or all lines 133 with secondary lines 134 and the accompanying secondary valves 136, or a combination of both these arrangements. Additionally, although not shown, these lines 133 may be subdivided into more than two secondary lines 134. The lines 133 and 134 as well as the valves 135 and 136 are primarily located within the machine area 120. As outlined below, battery storage container and wellness system 100 is designed so that when a fire is detected in a compartment, the plumbing arrangement 130 is designed to deliver a mitigation agent to that specific compartment.

Figure 1C:
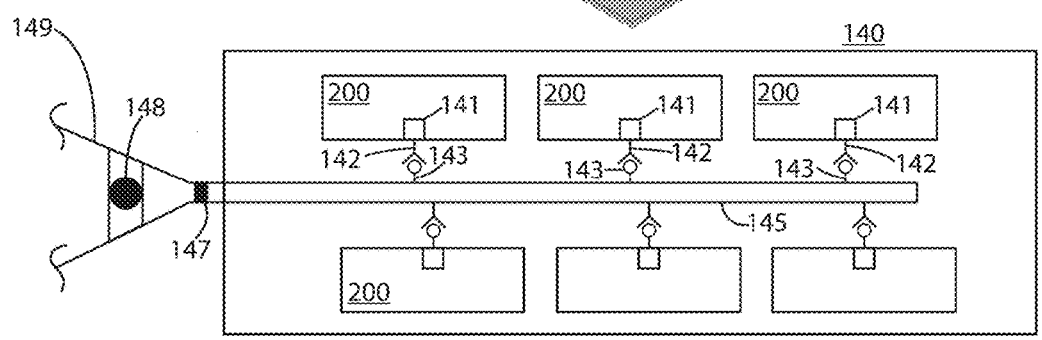
FIG. 1C is an exemplary schematic illustration of the exhaust arrangement of the battery storage container and wellness system, according to an embodiment of the invention.
Figure 1D:
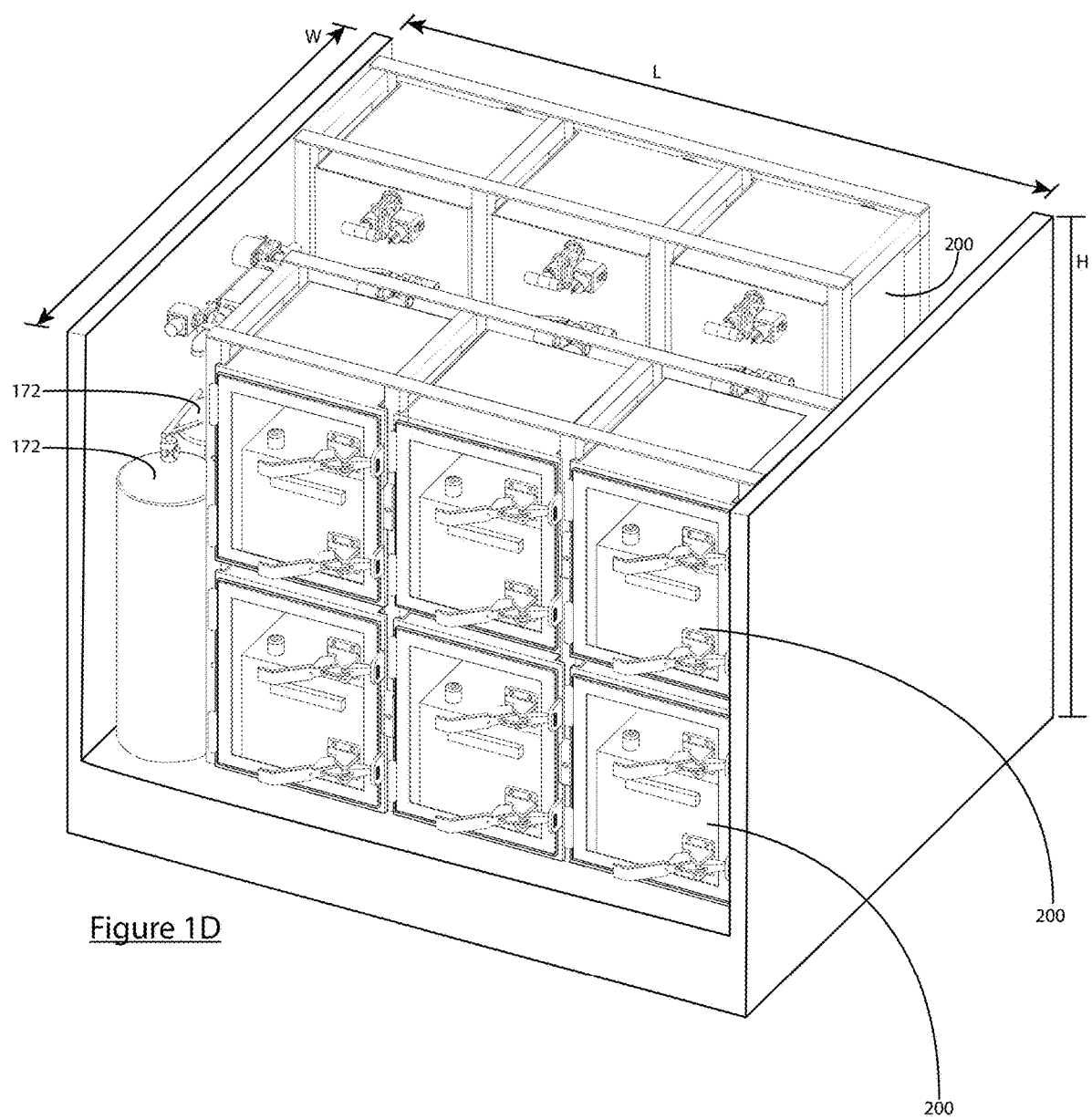
FIG. 1D is a perspective illustration, showing the compartments and the fire mitigation agent supply of the battery storage container and wellness system, according to an embodiment of the invention.

Returning to FIG. 1A, the machine area 120 includes also includes upper and lower plenums, which are part of an exhaust arrangement for the dispensation of combustion gasses away from compartments 200 and from the battery storage container and wellness system 100 itself. FIG. 1C is an exemplary schematic illustration of exhaust arrangement 140 of the battery storage container and wellness system 100, according to an embodiment of the invention. It should be understood that according to an embodiment of the invention, the system 100 includes substantially identical upper and lower exhaust arrangements so the arrangement of FIG. 1C is applicable to either an upper arrangement with an upper plenum or a lower arrangement with a lower plenum. The upper arrangement is associated with the upper compartments of the stacked compartments, and the lower arrangement is associated with the lower compartments of the stacked compartments.

FIG. 1C shows the exhaust arrangement 140 including a plurality of exhaust vents 141 located in each of the compartments 200. Each exhaust vent includes an associated valve 142 for purging combustion gases from the compartments into the plenum 145, which connects to all of the exhaust vents 141, via a duct 143. Each valve 142 may be a check valve, which prevents gasses or the like in the plenum 145 from entering into the respective compartment 200. According to an embodiment of the invention, in the event of fire in a compartment 200, combustions gases exit the compartment 200 through the valve 142 on account of the pressure differences. The valve 142 may a heavy-duty check valve rated to open at 1 psi. This allows a compartment 200 with a fire event to easily expel smoke and gas without affecting the contents of any other compartments 200.

FIG. 1C also shows the plenum 145 connected to an external ventilation system 149. The connection to the external ventilation system 149 may also be via a valve 147, which allows gasses from the plenum 145 to be fed into the external ventilation system 149. A fan 148 may be used to feed the gasses from the plenum to the external ventilation system 149. The external ventilation system 149 may be the existing ventilation system of the transportation vessel on which the battery storage container and wellness system 100 is being carried. According to an embodiment of the invention, the transportation vessel is an aircraft, and thus the external ventilation system is the ventilation in an aircraft. According to another embodiment, the transportation vessel is a water vessel, and the ventilation system is the water vessel's ventilation system.

As stated above the arrangement of FIG. 1C is applicable to either an upper arrangement with an upper plenum or a lower arrangement with a lower plenum. FIG. 1C shows the plenum 145 connected to the external ventilation system 149 via a valve 147. When the valve is opened, the fan 148 draws the air out of the plenum 145. This applies to both upper and lower exhaust arrangements 140. According to another embodiment of the invention, the upper and lower plenums may be connected to each other to form a single manifold, which then connects to the external ventilation system 149.

Figure 2A:
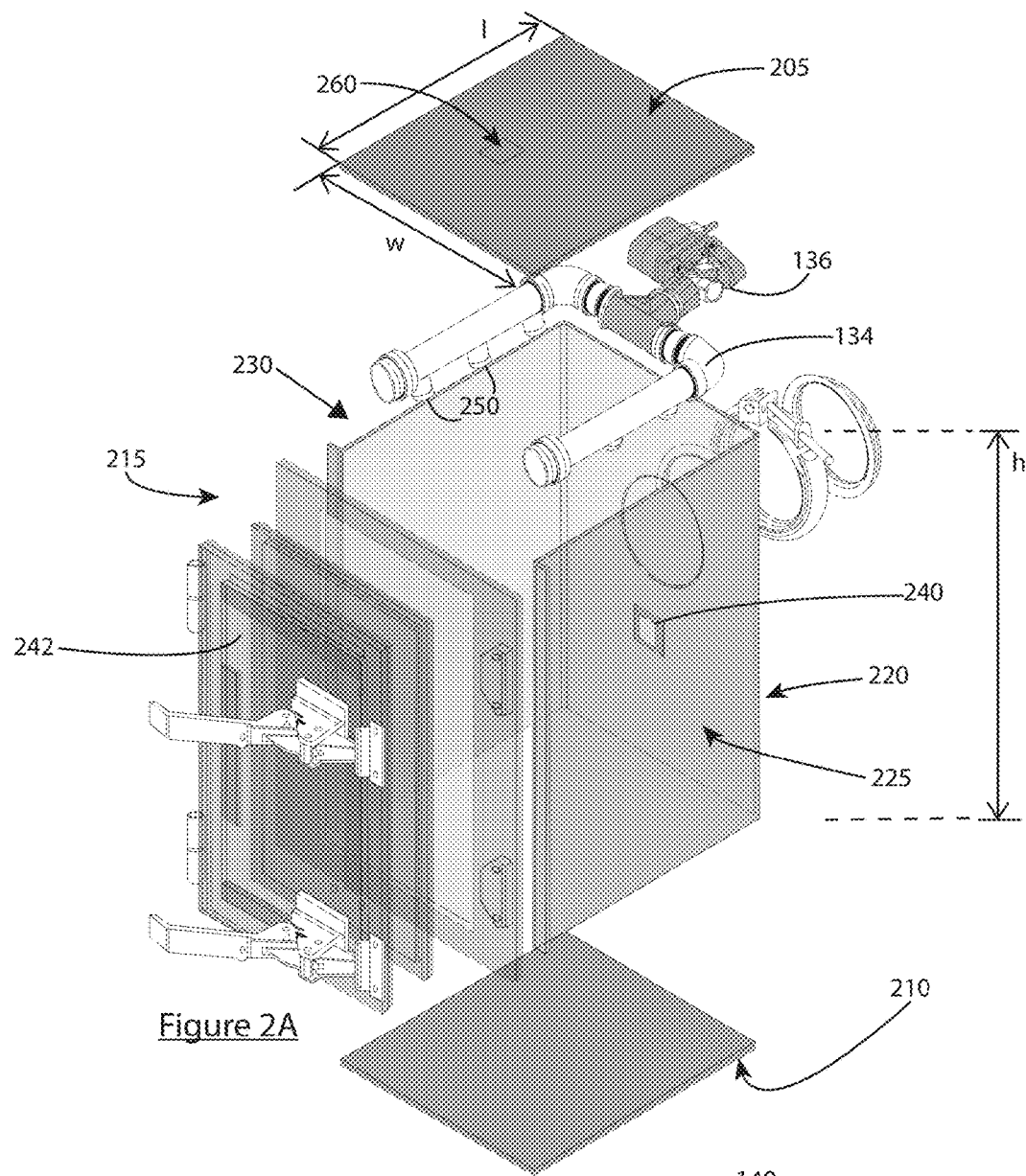
FIG. 2A is an exemplary exploded view of a battery storage compartment of the battery storage container and wellness system, according to an embodiment of the invention.

FIG. 2A is an exemplary exploded view of a battery storage compartment/locker 200 of the battery storage container and wellness system 100, according to an embodiment of the invention. Each compartment is equipped to store and charge a large battery, a group of smaller batteries, or a single smaller battery. The illustration of FIG. 2A is representative of each battery storage compartment 200 outlined above, and shown in FIGS. 1A-1C. FIG. 2A shows the compartment 200 being rectanguloid, and having a top portion 205, a bottom portion 210, a front portion 215, and a back portion 220. The compartment also includes a first side portion 225 and a second side portion 230, defining the sides of the compartments. As shown, the compartments have a length L, a width w, and a height h. According to an embodiment of the invention, l is 13.02 inches, w is 12.52 inches, and h is 15.11 inches.

According to an embodiment of the invention, each compartment 200 is made from steel. It is within the scope of the invention that the compartments 200 also include insulating liners. All these above mentioned portions of the compartment are built from or treated with fire-resistant materials. As stated above, in the event of fire in any particular compartment 200, the goal of the apparatus 100 is to prevent the spreading of the fire to other compartments. According to an embodiment of the invention, each compartment 200 is detachable, and thus can be removed from the system 100, e.g., if it experiences a fire event.

FIG. 2A shows each compartment 200 having a door 242 in the front portion 215 for placing Li-Ion batteries in the compartment 200 and also for removing the batteries. As outlined above, the batteries are not only stored in the compartments 200, but may also be charged. Therefore each compartment 200 also includes a charger connector/port 240 therein for connecting to battery leads to charge the battery or batteries while they are stored in the compartment. The connector 240 is part of any known charging arrangement including power, circuit, and controls to provide the most efficient charging current to the battery.

According to an embodiment of the invention, the charging arrangement is such that for each compartment/locker 200, it includes a charging circuit 275 that can charge a first battery type, and a second battery type. The charging circuit 275 can also charge a plurality of second battery types in a universal charger. In one exemplary embodiment the charging circuit can charge either a larger lithium ion battery of a Li6T format, or multiple smaller sized lithium ion batteries compatible with an Army universal charger such as such BB-2590/U batteries, or a single smaller battery.

Figure 2B:
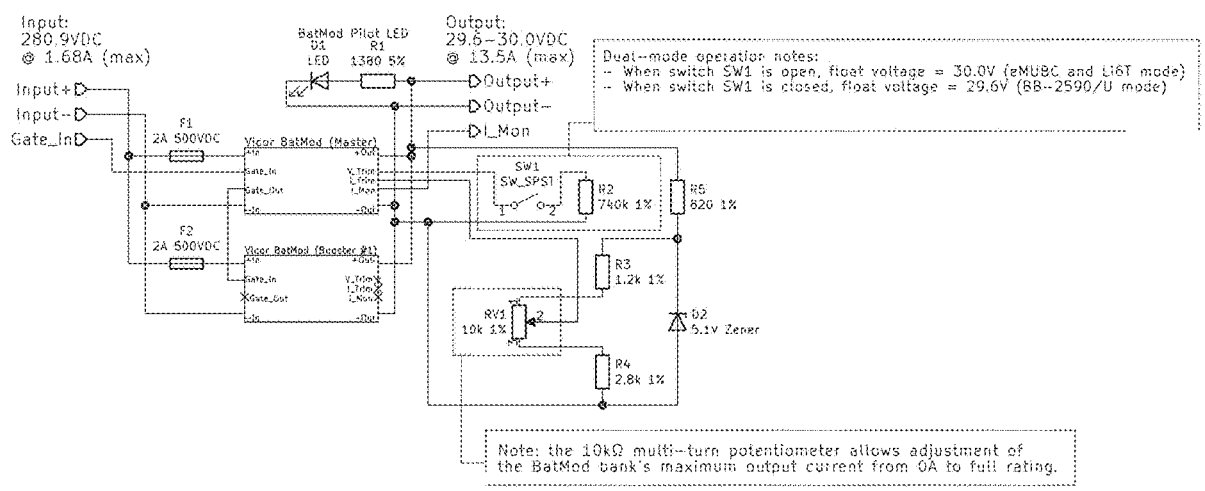
FIG. 2B is an exemplary illustration of a charging circuit for a single compartment, according to an embodiment of the invention.

FIG. 2B is an exemplary illustration of a charging circuit 275 for a single compartment 200, according to an embodiment of the invention. Identical replicas of charging circuit 275 is used each of the compartments/lockers 200. Charging circuit 275 outputs 29.6 VDC for single smaller batteries, such as BB-2590/U batteries. The charging circuit 275 outputs 30.0 VDC for Expeditionary Modular Universal Battery chargers, used to charge multiple smaller batteries compatible with the universal battery charge such as BB-2590/U types, and also for larger Li6T format batteries. As shown in FIG. 2B, the charging circuit 275 includes two battery charging modules in parallel for charging in two different modes. The switch SW1 is used to set the modes of operation. When the switch SWI is open, the float voltage is 30.0 VDC, and a larger Li6T format battery may be charged or a plurality of smaller batteries in an Expeditionary Modular Universal Battery charger. When the switch SW1 is closed, the float voltage is 29.6 VDC, and the single smaller such as a BB-2590/U battery may be charged. The charging is done via the port 240 shown in FIG. 2A.

Returning to FIG. 2A, the charger connector/port 240 may be positioned in, or may extend through any portion (205, 210, 215, 220, 225, 230) of the compartment. According to a particular embodiment, the charger connector 240 is mounted to the back portion 220, as shown in FIG. 2A. This charging capability allows batteries to arrive at full charge and ready for use, eliminating multiple hours of discharging and charging on either side of a transport mission.

FIG. 2A also shows a dedicated plumbing line 134 of the plumbing arrangement 130 outlined above. As shown, the line 134 extends through a cut-out section of the back portion 220 of the compartment 200. The line 134 extends through a topmost part of the back portion, and is positioned adjacent to the top portion/ceiling 205 of the compartment 200. This positioning at the top of the compartment allows for the application of mitigation agent in the event of fire. The line 134 includes a plurality of nozzles 250, through which the mitigation agent is sprayed.

FIG. 2A also shows the exhaust vent 141 in the back portion 220 through which combustion gases are to be purged from the compartment 200. As stated above, attached to the vent 141, is a duct/conduit 143 that leads to the plenum 145. A check valve 142, associated with the vent feeds combustion gasses and other associated particles out to the plenum under the force of pressure differences. [Start here]

FIG. 2A also shows a sensor 260 for sensing fires within the compartment 200, positioned at the top portion/ceiling 205. The positioning of the sensor 260 at the ceiling is optimal at the ceiling 205, however, the sensor may alternatively positioned at other locations within the compartment 200. The sensor 260 may be a known sensor such as a photoelectric or an ionization detector that detects fire and smoke. Photoelectric detectors would detect the difference in the transmission of light due to smoke or fire. Ionization detectors would detect the presence of hydrocarbons created by combustion. It is within the scope of this invention that the sensor 260 combines both photoelectric and ionization technologies in one device.

Figure 3:
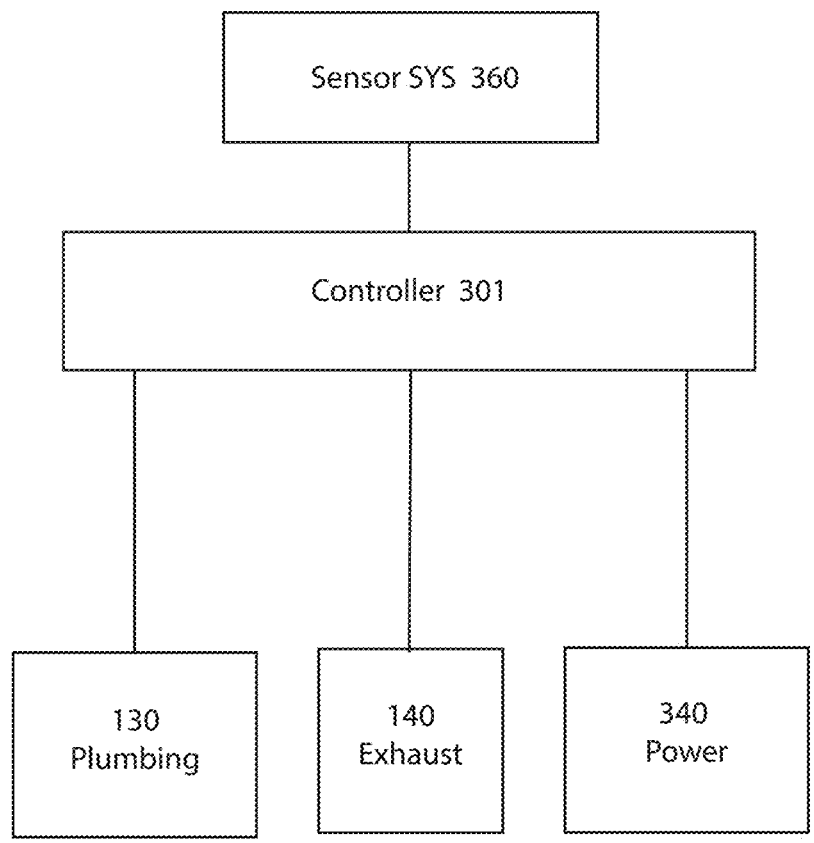
FIG. 3 is an exemplary controller system for the battery storage container and wellness system, according to an embodiment of the invention.

FIG. 3 is an exemplary controller system 300 for the battery storage container and wellness system, according to an embodiment of the invention. As shown, the controller system 300 includes a controller 301, which as shown in FIG. 1A is located in the bin 150, in which the environmental conditions are suitable to the operation of electronics. The electronics of the controller 301 may include hardware or software that includes firmware, resident software, microcode or the like. The controller 301 electronics may include a combination of hardware and software. The functions of the controller 301 may be defined in a computer program, on a platform such as a computer readable storage medium (or media) having computer readable program instructions. The computer readable storage medium may be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the fore-going.

FIG. 3 also shows the controller 301 is electronically attached to each of the sensor system 360, which is the array of sensors 260 in each of the compartments 200. The controller is also attached to the plumbing arrangement 130 and the exhaust arrangements 140. As outlined above, the plumbing arrangement 130 includes, but is not limited to the mitigation agent 171, which is fed from pressurized containers 172 and disbursed throughout the arrangement, the plurality of dedicated lines 133 and 134, leading to specific compartments 200, as well as the solenoid valves 135 and 136 for directing the flow of the mitigation agent through the pipe nozzles 250 to suppress fires. As outlined above, the exhaust arrangements 140 include an upper and lower arrangement, each arrangement includes, but is not limited to a plurality of exhaust vents 141 located in each of the compartments 200, as well as the associated valves 142 for feeding combustion gases and other particles into the plenum 145, which exhausts into the existing ventilation system 149 of the transportation vessel on which the battery storage container and wellness system 100 is being carried.

The controller 301 is also connected to a power supply 340. The power supply 340 supplies power to the plurality of compartments 200, and to each of the charging circuits 275 which are used to charge batteries stored therein. The controller 301 communicates with the power supply 340 to disrupt power to the particular charging circuits 275 and associated compartment or compartments 200 that are experiencing fire events.

Figure 4:
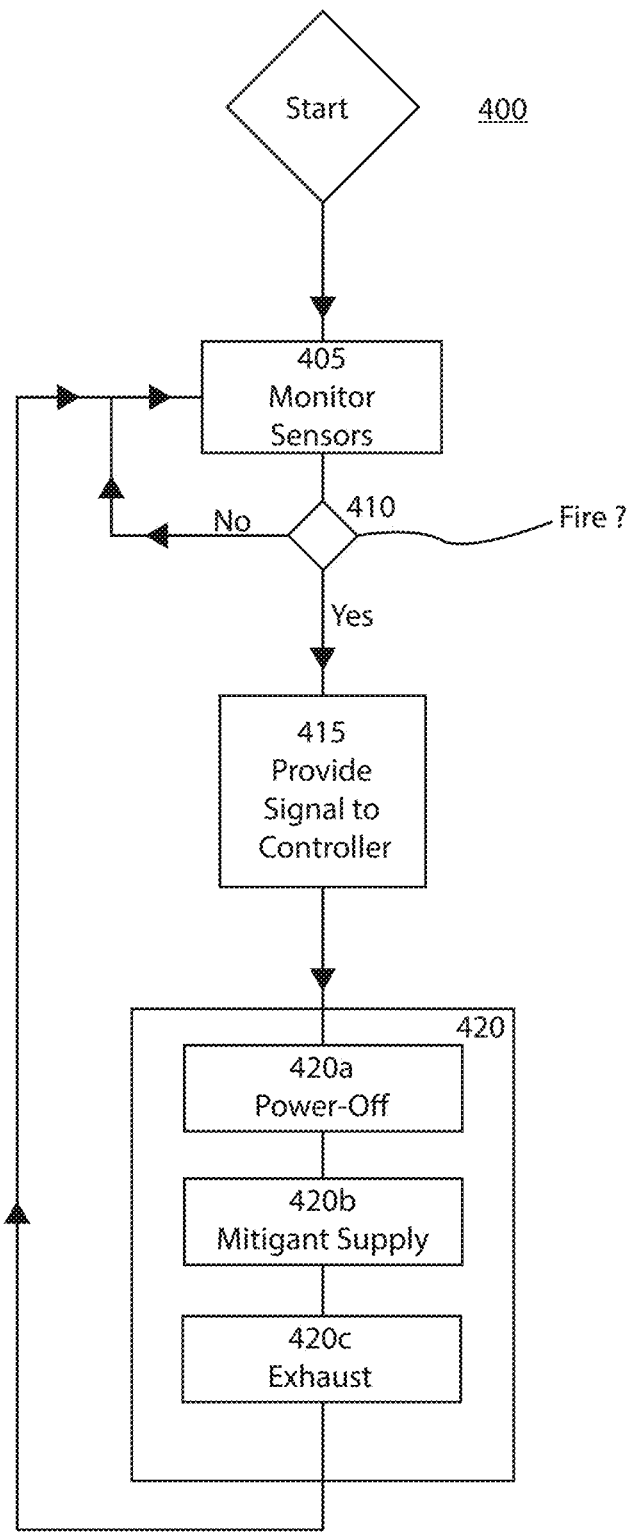
FIG. 4 is an exemplary flow diagram illustrating a method of monitoring and mitigating a compartment fire, according to an embodiment of the invention.

FIG. 4 is an exemplary flow diagram illustrating a method 400 of monitoring and mitigating a compartment fire, according to an embodiment of the invention. The explanation of the method 400, is done with reference to the above-outlined structure, as shown in FIGS. 1A, 1B, 1C, 2, and 3. As outlined below, the method 400 is a continuous monitoring process. It should be understood that the fire mitigation steps outlined below work in conjunction with the fire-mitigating structure of the system 100, such as the compartmentalized steel structure including the compartments/lockers 200, as well as the air gaps 110 that separate adjacent columns of compartments/lockers, positioned to prevent fire from spreading from one compartment 200 to an adjacent compartment 200.

The method 400 begins at 405, at which stage the sensor system 360 is monitored. As stated above the sensor system 360 is the array of fire sensors 260 in each of the compartments/lockers 200. Thus each sensor 260 in each compartment monitors for signs of a compartment fire. As shown at 410, if no fire is detected, the sensor system 360 continues monitoring.

If a fire is detected, at step 415, the sensor system 360 communicates via a signal, to the controller 301. Communications between the controller 301 and other elements, such as the sensor system 360 e.g., is accomplished via known means, such as a dedicated line with a shared data bus, or via wireless communications. The signal transmits information indicating the specific compartment or compartments 200 in which the fire is detected. Based on the information about the fire, and the location thereof, at step 420 the controller 301 shuts off the power (step $420_a$) to the one or more compartments affected by fire, by shutting the power supply to the associated charging circuit 275. This stops any charging of batteries in the specific compartment or compartments 200.

Based on the information about the fire, and the location thereof, at step 420 the controller 301 also delivers fire mitigating agent 171 (step $420_b$) to the affected compartment or compartments 200 experiencing a fire event. The controller 301 signals the solenoid valves 135 and 136 to deliver the mitigating agent 171 through the nozzle or nozzles 250 in the affected compartment. As stated above, the mitigation agent 171 may be a water/ethylene glycol mix, or other known agents such as aqueous vermiculite dispersion, Fire-Ice, or the like. The fire mitigation agent 171 may be supplied from one or both of the pressurized supply containers 172.

The flow diagram of FIG. 4 also shows at step 420*c*, the combustion gasses and particles, which are at elevated temperatures, are drawn out of the affected compartment or compartments 200. This is accomplished via check valves 142, which automatically perform this function on account of the pressure differences in the affected compartment or compartments 200, as compared to the duct 143 and plenum 145. Once the gasses are in the plenum, the fan 148 is used to draw the gasses out of the plenum 145 to the external ventilation system 149. It should be understood that the fire mitigation step 420 includes three distinct acts, i.e., shutting off the power at 420*a*, providing mitigating agent 171 to extinguish the fire at 420*b*, and removal of combustion gasses and particles at 420*c*. These fire-mitigation steps 420*a*, 420*b*, and 420*c* may be performed contemporaneously. Alternatively, steps 420*a*, 420*b*, and 420*c* may be performed sequentially in any order, but in quick response to combustion.

As shown in FIG. 4, according to the process 400, continued monitoring of the sensor system 360 is performed, returning to step 405. Therefore sensors 260 of unaffected compartments/lockers 200 continue to detect whether or not there are fires. Contemporaneously, the sensors 260 continue to monitor is the affected compartments continue to be affected by fire. As stated above, according to an embodiment of the invention, the sensors 260 may be combination sensors having photoelectric and ionization sensing components that detects both fire-light and hydrocarbons created by combustion. Therefore in the instances in which the flames have been extinguished, but combustion hydrocarbons are detected, the sensors 260 continue to sense the dangers associated with fire, and the mitigation protocols continue. These signals are sent to the controller 301 at step 410, and the controller continues to mitigate the fire and steps 420*b* and 420*c* are continuously performed. Note that if 420*a* has already been performed in a fire-affected compartment 200, i.e., the shutting off of the power, then this step is not repeated, because the power is shut off in that compartment until maintenance is performed on the affected compartment. If at some stage no more fires are detected, then the compartments are continuously monitored at 405, without the provision of the fire-mitigating steps.

What is claimed:

1. A battery storage container and wellness system comprising:
    a rectanguloid container having a first side and a second side, with a plurality of battery storage compartments at the first side, and a plurality of battery storage compartments at the second side, the rectanguloid container having a machine area between the first side and the second side, the machine area providing an extended gap between the plurality of battery storage compartments at the first side and the plurality of battery storage compartments at the second side, wherein each of the battery storage compartments in the plurality of battery storage compartments at the first side and the plurality of battery storage compartments at the second side is stacked in columns having at least an upper compartment area and a lower compartment area, wherein an air gap between adjacent columns prevents spreading of fire from one column to another column, and wherein each of the battery storage compartments is rectanguloid and comprises
        a top portion, a bottom portion, a front portion, a back portion, and first and second side portions,
        a door at the front portion for placing and removing batteries,
        a charging circuit and an associated charger port for charging batteries therein, and
        a sensor for detecting fires within the battery storage compartment;
    a plumbing arrangement comprising
        at least two supply containers having fire mitigating fluid therein, wherein each of the at least two supply containers are pressurized for disbursing the fire mitigating fluid to any of the battery storage compartments in the plurality of battery storage compartments at the first side and the plurality of battery storage compartments at the second side,
        a plurality of dedicated lines located primarily in the machine area, extending from the supply containers to each of the battery storage compartments, wherein respective dedicated lines extend through a topmost part of the back portion of each of the battery storage compartments, and
        one or more valves for directing the fire mitigating fluid from the at least two pressurized supply containers to desired battery storage compartment;
    an exhaust arrangement located primarily in the machine area, the exhaust arrangement comprising
        an upper plenum arrangement, and
        a lower plenum arrangement, wherein each of the upper plenum arrangement and the lower plenum arrangement comprises,
            a plurality of exhaust vents, with one of the plurality of vents in each battery storage compartment in the plurality of battery storage compartments at the first side and the plurality of battery storage compartments at the second side,
            a check valve associated with each exhaust vent for directing combustion gasses and particles out of battery storage compartment,
            a plurality of ducts, with one of the plurality of ducts at the back portion of each battery storage compartment and associated with one of the exhaust vents and the check valve for feeding the combustion gasses and particles, and
            a plenum to which each of the plurality of ducts is connected, for receiving combustion gasses and particles fed from the ducts, and for feeding the combustion gasses and particles to an external ventilation system;
    a power supply to supply power to each charging circuit in each of the battery storage compartments of the plurality of compartments at the first side and the Plurality of battery storage compartments at the second side;
    a sensor system comprising the plurality of sensors in each of the battery storage compartments;
    a control system comprising
        a controller electronically attached to each of the sensor system, plumbing arrangement, and the exhaust arrangement, wherein when one or more sensors of the sensor system detects a fire, the controller initiates the plumbing arrangement to deliver the fire mitigating fluid to at least one battery storage compartment experiencing fire events, and shuts off power to the charging circuits in the at least one battery storage compartment experiencing fire events, and wherein the check valve in the at least one battery storage compartment experiencing fire events exhausts combustion gasses and particles to a respective upper or lower plenum.

2. The battery storage container and wellness system of claim 1, wherein the battery charging circuit comprises two battery charging modules in parallel for charging a first battery type, a second battery type, and a plurality of said second battery type.

3. The battery storage container and wellness system of claim 2, wherein the rectanguloid container has a length L, a width W, and a height H, wherein L is 51.75 inches, W is 43.75 inches, and H is 43 inches, and wherein the air gap between adjacent columns is 1 inch.

4. The battery storage container and wellness system of claim 3, wherein each compartment has a length l, a width w, and a height h, wherein l is 13.02 inches, w is 12.52 inches, and h is 15.11 inches.

\* \* \* \* \*

UNITED STATES PATENT AND TRADEMARK OFFICE
CERTIFICATE OF CORRECTION

| | | |
|---|---|---|
| PATENT NO. | : 11,715,963 B1 | Page 1 of 1 |
| APPLICATION NO. | : 17/244872 | |
| DATED | : December 5, 2023 | |
| INVENTOR(S) | : Hays et al. | |

It is certified that error appears in the above-identified patent and that said Letters Patent is hereby corrected as shown below:

On the Title Page

Item (72) please add inventor:
Kevin Lin North Potomac, MD

Signed and Sealed this
First Day of October, 2024

Katherine Kelly Vidal
*Director of the United States Patent and Trademark Office*